United States Patent Office 3,190,796
Patented June 22, 1965

3,190,796
PROCESS FOR INHIBITING THE GROWTH OF MICROCOCCUS AGILIS WITH 11β-HYDROXY-11-(2-PYRIDYLMETHYL)-PREGNANE-3,20-DIONE
Gunther S. Fonken, Charleston Township, Kalamazoo County, Mich., assignor to The Upjohn Company, Kalamazoo, Mich., a corporation of Delaware
No Drawing. Filed Apr. 25, 1963, Ser. No. 275,489
2 Claims. (Cl. 167—30)

This application is a continuation-in-part of application Serial No. 200,297, filed June 6, 1962.

The present invention relates to a method for preventing pink slime in the paper making industry. More particularly, this invention relates to inhibiting the growth of *Micrococcus agilis* by contacting the organism with 11β-hydroxy-11-(2-pyridylmethyl)pregnane-3,20-dione.

*Micrococcus agilis* is a bacterial organism which contaminates the paper making wood pulp and produces a pink slime creating a problem in paper production.

It has now been discovered according to the present invention that 11β-hydroxy-11-(2-pyridylmethyl)pregnane-3,20-dione will inhibit the growth of *Micrococcus agilis* when brought into contact with the viable cells.

The contact between the steroid and microorganisms is facilitated by use of a carrier, the simplest being water. Other fluid carriers adapted to washing or spraying operations can also be used, as can aerosols.

The solutions are useful in cleaning the apparatus used in paper production to prevent contamination and formation of pink slime by the organism. The steroid can also be dissolved in the pulp slurry to prevent growth in the slurry and the apparatus in which the slurry is held.

For inhibiting the growth of *Micrococcus agilis* a preferred concentration of 11β-hydroxy-11-(2-pyridylmethyl)pregnane-3,20-dione of from about 0.05% to about 0.5% w./v. is used.

The active compounds of the present invention are prepared starting with a pregnane-3,11,20-trione 3,20-bis(alkylene ketal).

The main steroid starting material, 5β-pregnane-3,11,20-trione 3,20-bis(ethylene ketal) was prepared as shown in U.S. Patent 2,897,198, which is the method employed by Oliveto et al. [J.A.C.S., 75, 486 (1953)].

In the same manner, the 5α-pregnane-3,11,20-trione 3,20-bis(ethylene ketal) has been prepared by reacting allopregnane-3,11,20-trione with ethylene glycol in the presence of p-toluenesulfonic acid monohydrate in toluene solution.

According to the process of this invention, to the lithium Grignard reagent, α-picolyllithium, dissolved in an organic solvent, inert to the reaction, such as ether, tetrahydrofuran, benzene and the like, is added 5β- (or 5α-) pregnane-3,11,20-trione 3,20-bis ketal. The addition of the steroid is generally made at a temperature between —40 and 30° C., but higher or lower temperatures, not interfering with the solubility of the steroid and reactant, can be used. The time of reaction is usually between 6 and 96 hours, but shorter or longer periods are also operative. The amount of heat evolved in this reaction is rather small and cooling is therefore generally unnecessary. At the termination of the reaction, the solution is generally washed with water, dried and evaporated and the residue thus obtained is purified by standard methods, such as extraction, recrystallization and chromatography.

The ketal groups of the thus-obtained 11α-substituted steroid are removed by methods well known in the art such as acid hydrolysis, with dilute sulfuric or hydrochloric acid, in an organic solvent such as methanol, ethanol and the like.

PREPARATION 1

11α-(2-pyrydylmethyl)-11β-hydroxy-5β-pregnane-3,20-dione 3,20-bis(ethylene ketal)

A solution was prepared of α-picolyllithium using 6.9 g. of lithium wire, in the procedure shown in Org. Syn. 23, 83 (1943). To this solution was added rapidly a solution of 20.9 gm. (50 millimoles) of 5β-pregnane-3,11,20-trione 3,20-bis(ethylene ketal), dissolved in 100 ml. of benzene and 100 ml. of ether. During the addition a very small amount of heat was evolved. After the mixture had stood at room temperature (22 to 26° C.) during a period of three days, it was washed (cautiously) four times with water, filtered through sodium sulfate and concentrated at reduced pressure to a thick oil which was chromatographed over Florisil, taking fractions of 1.5 l. as follows:

TABLE I

| Fraction: | Solvent |
|---|---|
| 1 | Skellysolve B. |
| 2 | 2% acetone-Skellysolve B hexanes. |
| 3 | 5% acetone-Skellysolve B hexanes. |
| 4 | 10% acetone-Skelysolve B hexanes. |
| 5 | 25% acetone-Skellysolve B hexanes. |
|  | Acetone. |

Fraction 5 was evaporated and the residue recrystallized from methanol to give 13.44 gm. of crude 11α-(2-pyridylmethyl)-11β-hydroxy-5β-pregnane - 3,20 - dione 3,20-bis (ethylene ketal) of melting point 148 to 152° C. A further recrystallization of a sample from methanol gave pure 11α-(2-pyridylmethyl)-11β-hydroxy - 5β - pregnane-3,20-dione 3,20-bis(ethylene ketal) of melting point 154 to 156° C., rotation [α]$_D$—58° (in acetone);

$$\lambda^{EtOH}_{max.}\ 264\ m\mu;\ a_M\ 3775$$

PREPARATION 2

11-(2-pyrydylmethyl)-11β-hydroxy-5β-pregnane-3,20-dione

A solution of 5 gm. of 11α-(2-pyridylmethyl)-11β-hydroxy-5β-pregnane-3,20-dione 3,20-bis(ethylene ketal) in 500 ml. of methanol was stirred overnight at room temperature with 100 ml. of N hydrochloric acid. The mixture was concentrated to 100 ml. of volume in vacuo and thereupon 200 ml. of aqueous 4% sodium bicarbonate solution was added. The precipitated product was recovered by filtration. Recrystallization from aqueous methanol gave 2.68 gm. of 11α-(2-pyridylmethyl)-11β-hydroxy-5β-pregnane-3,20-dione of melting point 167 to 172° C. Recrystallization of this material gave pure 11α-(2-pyridylmethyl)-11β-hydroxy-5β-pregnane - 3,20 - dione of melting point 170 to 173° C. after two recrystallizations from aqueous methanol. Rotation of this material was [α]$_D$—10° in acetone.

Analysis.—Calcd. for $C_{27}H_{37}NO_3$: C, 76.56; H, 8.81; N, 3.31. Found: C, 76.37; H, 9.06; N, 3.39.

PREPARATION 3

11α-(2-pyridylmethyl)-11β-hydroxy-5α-pregnane-3,20-dione 3,20-bis(ethylene ketal)

5α-pregnane-3,11,20-trione 3,20-bis(ethylene ketal) was reacted as in Preparation 1 with α-picolyllithium. The mixture was allowed to stand for 42 hours, was thereupon washed with water and the organic layer filtered through sodium sulfate and concentrated at reduced pressure. The material was two times extracted with 10% acetone-Skellysolve B solution and the extract discarded. The remainder was recrystallized three times from methanol to give 11α-(2-pyridylmethyl)-11β-hydroxy-5α-pregnane-3,20-dione 3,20-bis(ethylene ketal).

PREPARATION 4

11α-(2-pyridylmethyl)-11β-hydroxy-5α-pregnane-3,20-dione

A solution of 2 gm. of 11α-(2-pyridylmethyl)-11β-hydroxy-5α-pregnane-3,20-dione 3,20 - dione 3,20 - bis (ethylene ketal) in 200 ml. of methanol was stirred for a period of 18 hours at room temperature with 50 ml. of N hydrochloric acid. The mixture was concentrated to a volume of 40 ml. in vacuo. After the product was recovered by filtration it was recrystallized from aqueous methanol to give pure crystalline 11α-(2-pyridylmethyl)-11β-hydroxy-5α-pregnane-3,20-dione.

PREPARATION 5

11α(2-pyridylmethyl)-11β-hydroxy-5β-pregnane-3,20-dione hydrochloride

To a solution of 4.2 gm. (0.01 mole) of 11α-(2-pyridylmethyl)-11β-hydroxy-5β-pregnane-3,20-dione dissolved in 200 ml. of methanol is added 10 cc. of 1 molar aqueous hydrochloric acid solution. The hydrochloride salt is recovered in a dry state by vacuum evaporation of the solvent.

In similar manner, the sulfate, nitrate and perchlorate salts are prepared by substituting a stoichiometric amount of sulfuric, nitric and perchloric acids for the hydrochloric acid.

In similar manner, salts of 11α-(2-pyridylmethyl)-11β-hydroxy-5α-pregnane-3,20-dione are prepared.

EXAMPLE

To 10,000 liters of water slurry in a beater tank, 10 kilograms of 11β-hydroxy-11-(2-pyridylmethyl)pregnane-3,20-dione is added.

The steroid prevents the formation of pink slime in the water slurry and protects the stock (and apparatus) from becoming contaminated with pink slime caused by the growth of *M. agilis* during the paper making process.

What is claimed is:

1. A process for inhibiting the growth of *Micrococcus agilis* comprising the contacting of viable *Micrococcus agilis* cells with a member selected from the group consisting of 11β-hydroxy-11-(2-pyridylmethyl)pregnane-3,20-dione and the acid addition salts thereof.

2. The process of claim 1 wherein the said member is in combination with a carrier in a concentration of from about 0.05 to about 0.5%.

References Cited by the Examiner

UNITED STATES PATENTS 3,113,078   12/63   Neely _____ 195—96

A. LOUIS MONACELL, *Primary Examiner.*